US007411374B2

(12) United States Patent
Tan et al.

(10) Patent No.: US 7,411,374 B2
(45) Date of Patent: Aug. 12, 2008

(54) CIRCUITRY AND CONTROL METHOD FOR CHARGING CAPACITIVE LOADS

(75) Inventors: Seeteck Tan, Singapore (SG); Vlad Mihall Popescu-Stanesti, San Jose, CA (US)

(73) Assignee: 02Micro Intermnational Limited, Grand Cayman (KY)

( * ) Notice: Subject to any disclaimer, the term of this patent is extended or adjusted under 35 U.S.C. 154(b) by 274 days.

(21) Appl. No.: 10/943,322

(22) Filed: Sep. 17, 2004

(65) Prior Publication Data
US 2005/0237032 A1 Oct. 27, 2005

Related U.S. Application Data

(60) Provisional application No. 60/564,395, filed on Apr. 22, 2004, provisional application No. 60/563,902, filed on Apr. 21, 2004.

(51) Int. Cl.
*H02J 7/00* (2006.01)
*H02M 7/757* (2006.01)
*H03K 17/14* (2006.01)

(52) U.S. Cl. ...................... 320/166; 320/140; 327/378; 363/56.1

(58) Field of Classification Search ................. 320/140, 320/166; 363/79; 327/378
See application file for complete search history.

(56) References Cited

U.S. PATENT DOCUMENTS

| 5,991,166 | A | * | 11/1999 | Kalfhaus | .................... 363/16 |
| 6,219,493 | B1 | | 4/2001 | Aoki et al. | .................. 396/206 |
| 6,359,795 | B1 | * | 3/2002 | Amantea et al. | ......... 363/21.01 |
| 6,518,733 | B1 | * | 2/2003 | Schenkel et al. | ............ 320/166 |
| 6,828,803 | B2 | | 12/2004 | Ichimasa et al. | ............ 324/678 |
| 2003/0025510 | A1 | | 2/2003 | Ichimasa et al. | ............ 324/547 |

FOREIGN PATENT DOCUMENTS

| JP | 64-1474 | 1/1989 |
| JP | 07-015958 | 1/1995 |
| WO | 30/036782 | 5/2003 |
| WO | WO03/036782 | 5/2003 |

\* cited by examiner

*Primary Examiner*—Gary L Laxton
*Assistant Examiner*—Yalkew Fantu

(57) ABSTRACT

A capacitor charging circuit comprises, power transfer circuitry, power switching control circuitry and voltage measurement circuitry. The power transfer circuitry transfers power from a power source to a capacitor. The power switching control circuitry controls the switching that causes power to be delivered to the power transfer circuitry. The voltage measurement circuitry indirectly measures the output voltage to determine when to stop charging the capacitor.

27 Claims, 6 Drawing Sheets

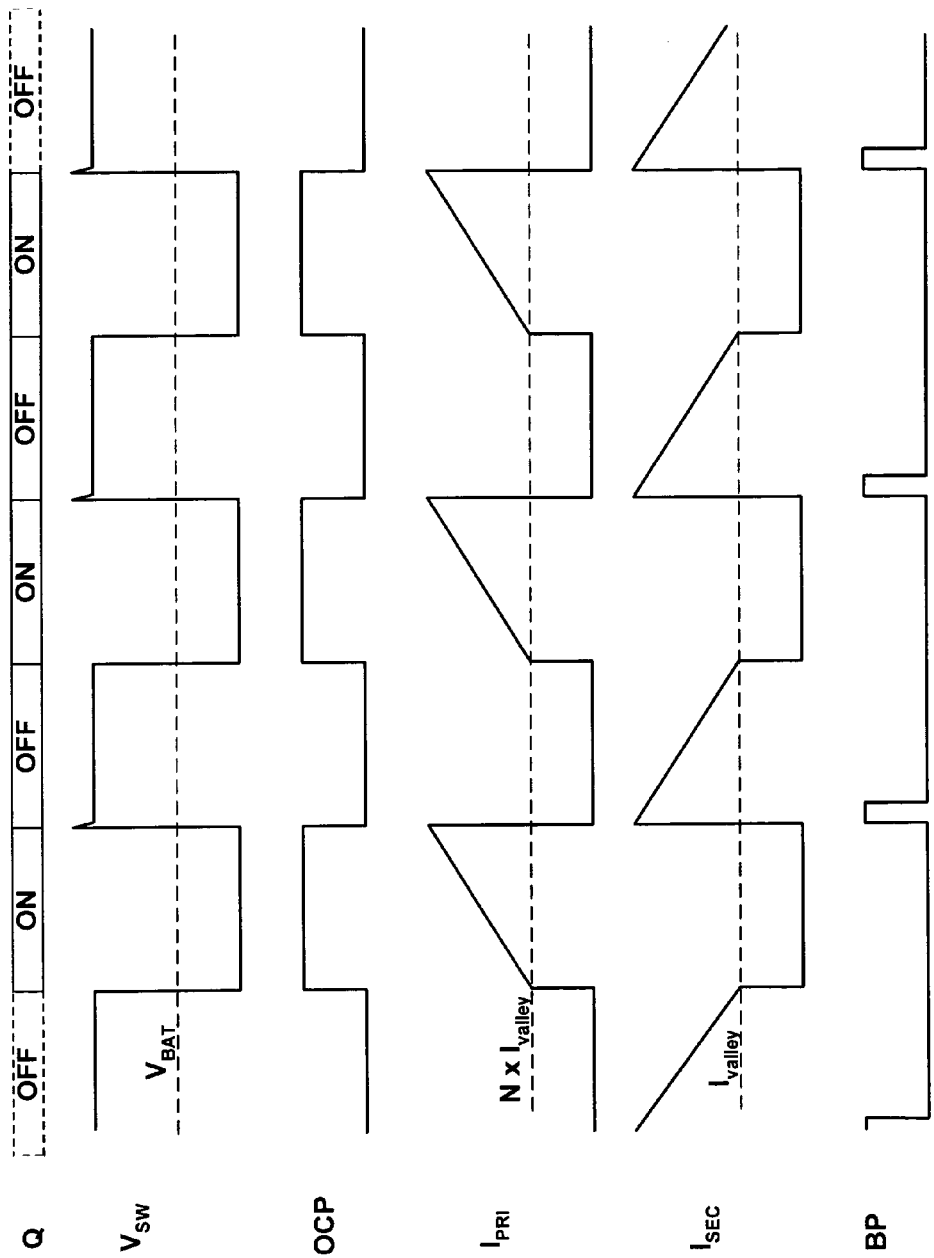
Figure 7 - Continuous Current Operation

CIRCUITRY AND CONTROL METHOD FOR CHARGING CAPACITIVE LOADS

CROSS-REFERENCE TO RELATED APPLICATIONS

This application claims the benefit of U.S. Provisional Application Ser. No. 60/563,902 filed Apr. 21, 2004 and U.S. Provisional Application Ser. No. 60/564,395 filed Apr. 22, 2004, both of which are fully incorporated herein by reference.

FIELD

This disclosure relates to charging capacitive loads and more particularly, to capacitor charging circuitry that controls switching and delivery of power.

BACKGROUND

Capacitor charging circuitry is used to charge capacitive loads, for example, in conventional photoflash systems. In conventional capacitor charging circuitry, a power switch is turned on and off to control the delivery of power from a power source to the capacitive load. Under varying load conditions or output voltage requirements, the output voltage is monitored and switching is adjusted to meet the output voltage and load requirements.

One example of conventional capacitor charging circuitry 10 is shown in FIG. 1. In this circuitry 10, power is delivered to capacitor ($C_{out}$) 12 via transformer 14. When a power switch 16 is activated, current flows into a primary coil of the transformer 14. When the power switch 16 is de-activated, the energy stored in the transformer 14 is transferred to the capacitor 12. The output voltage $V_{out}$ is monitored through the secondary coil of the transformer 14 via resistive divider 20 (R1 and R2). One disadvantage of this method of monitoring $V_{out}$ is the loss of capacitor energy due to the leakage current flowing through the resistors R1 and R2.

The power switch 16 is activated and deactivated by a latch 18 coupled to the output of comparators 24, 26, which controls the activation of the power switch 16 in response to the primary coil current $I_{pri}$ and secondary coil current $I_{sec}$. Once the primary coil current $I_{pri}$ exceeds a limit, the switch 16 is deactivated and the energy of the transformer 14 is transferred into capacitor 12. This method of limiting the primary coil current $I_{pri}$ for current protection and charging control uses a sense resistor 30 at the primary side of the transformer 14. One disadvantage of this method of current protection and charge control is the power dissipation due to the resistance $R_{pri}$. A sense resistor 32 is also used on the secondary side of the transformer 14, and once the secondary coil current $I_{sec}$ drops below a limit, the switch 16 is activated to start a new charging cycle.

Accordingly, there is a need for capacitor charging circuitry and a charging control method that minimizes current leakage and power dissipation.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 7 is a timing diagram illustrating waveforms during another mode of operation of power switching control circuitry.

Although the following Detailed Description will proceed with reference being made to illustrative embodiments, many alternatives, modifications, and variations thereof will be apparent to those skilled in the art. Accordingly, it is intended that the subject matter be viewed broadly, and be defined only as set forth in the accompanying claims.

DETAILED DESCRIPTION

In general, a capacitor charging circuit charges a capacitive load by initiating a power delivery switching cycle during which power is switched on for a constant duration referred to as the ON-time. After the constant duration or ON-time expires, power is switched off. The capacitor charging circuit monitors voltage levels to determine when to initiate another power delivery switching cycle. The capacitor charging circuit may also monitor output voltage levels indirectly to determine when to stop capacitor charging.

According to one exemplary application, the capacitor charging circuit is used for the generation of high voltage for the photoflash of a camera. The capacitor charging circuit may be a component of a power management system for a digital device such as a digital camera. Those skilled in the art will recognize that the capacitor charging circuit may be used in other applications and devices. As used in any embodiment herein, "circuit" and "circuitry" may comprise, for example, singly or in any combination, hardwired circuitry, programmable circuitry, state machine circuitry, and/or firmware that stores instructions executed by programmable circuitry. "Integrated circuit", as used in any embodiment herein, may mean a semiconductor device and/or microelectronic device, such as, for example, a semiconductor integrated circuit chip.

Figure 1:
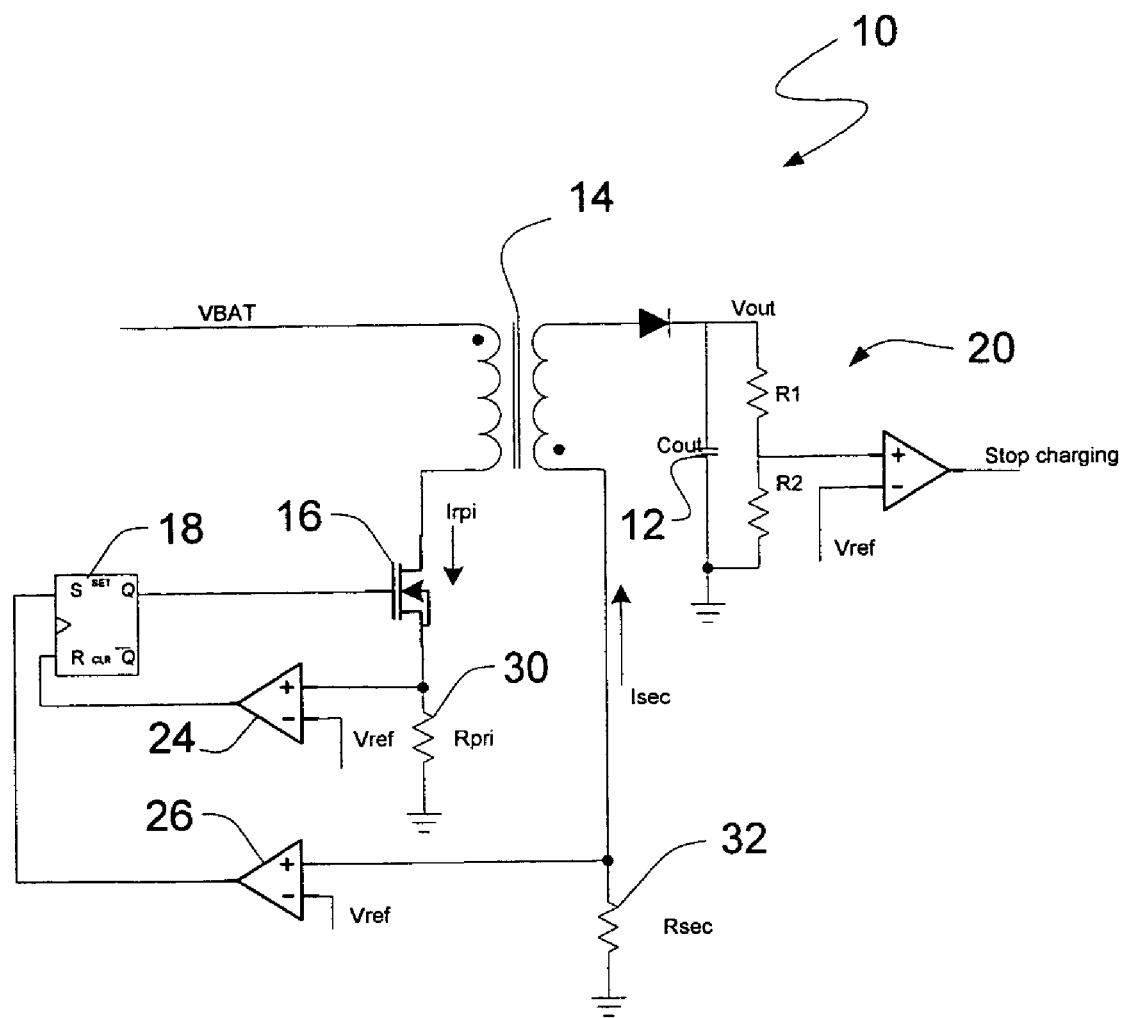
FIG. 1 is a circuit diagram of conventional capacitor charging circuitry.
Figure 2A:
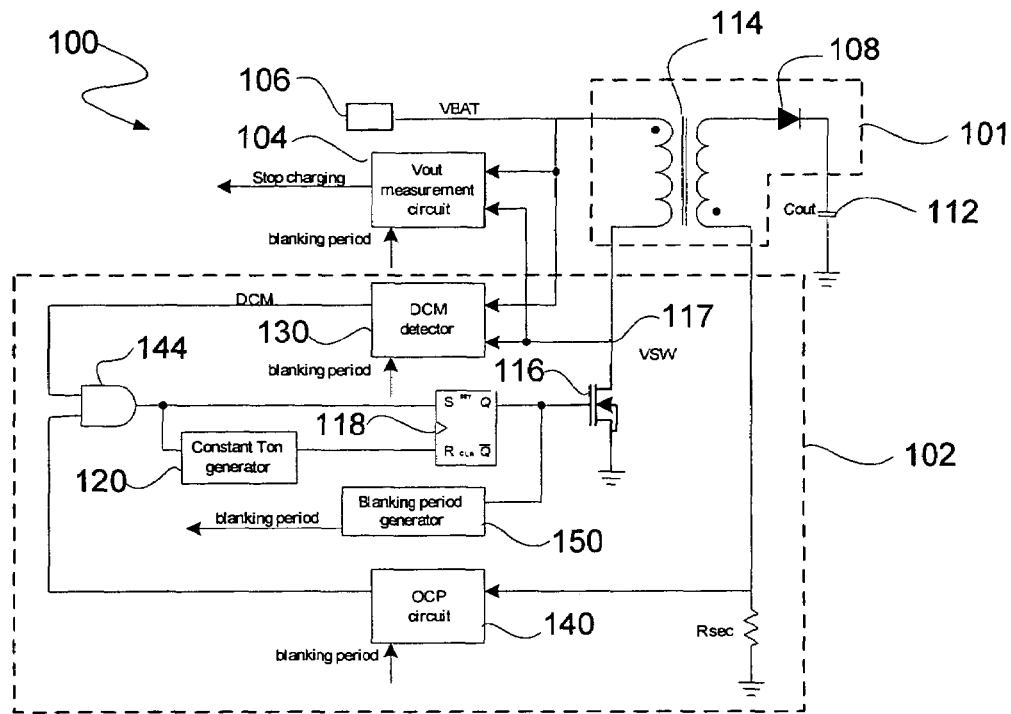
FIG. 2A is a schematic diagram of capacitor charging circuitry consistent with one embodiment.

FIG. 2A illustrates one embodiment of capacitor charging circuitry 100 for charging a capacitive load. The exemplary capacitor charging circuitry 100 includes power transfer circuitry 101, power switching control circuitry 102 and voltage measurement circuitry 104. A power source 106, such as a battery, is coupled to the power transfer circuitry 101, the power switching control circuitry 102 and the voltage measurement circuitry 104. A capacitive load or capacitor 112 is coupled to the power transfer circuitry 101. Power switching control circuitry 102 and/or voltage measurement circuitry 104 may comprised discrete components, or may be embodied as an integrated circuit. Although the exemplary embodiments of the circuitry described below have specific configurations or designs, those skilled in the art will recognize that other circuit configurations and designs may be used to perform the functions described herein.

The exemplary power transfer circuitry 101 includes a transformer 114, such as a flyback transformer having primary and secondary coils or windings with opposite polarity. Power is delivered to the transformer 114 when the primary winding of the transformer 114 is energized by the power source 106. When the transformer 114 is no longer energized by the power source 106, the energy is transferred from the transformer 114 to the capacitor 112, thereby charging the capacitor 112. An output diode 108 may be coupled between the capacitor 112 and the transformer 114 to prevent the capacitor 112 from being discharged through the transformer 114 while the power is being delivered to the transformer 114.

The power switching control circuitry 102 controls the switching of the power source 106 to the transformer 114 by initiating power delivery switching cycles during which power is switched on for a constant duration or ON-time ($T_{on}$). During the constant ON-time, the power switching control circuitry 102 maintains power delivery to the transformer 114 irrespective of the current across the primary winding of the transformer 114. The voltage measurement circuitry 104 indirectly measures the output voltage to determine when to stop charging the capacitor 112.

The exemplary power switching control circuitry 102 includes a power switch 116 that causes power to be delivered to the transformer 114 when the switch 116 is activated by a flip-flop or latch 118. The latch 118 activates the switch 116 during the constant ON-time and deactivates the switch 116 when the constant ON-time expires. To control the switching, the exemplary power switching control circuitry 102 also includes constant ON-time generator circuitry 120, discontinuous conduction mode (DCM) detection circuitry 130, and overcurrent protection (OCP) circuitry 140. The constant ON-time generator circuitry 120 determines the constant ON-time of the power delivery switching cycle. The DCM detection circuitry 130 detects the occurrence of discontinuous conduction mode, for example, when the flux within the transformer 114 has collapsed. The OCP circuitry 140 provides overcurrent protection by detecting current levels in the transformer 114 that may result in an excessive current when the switch 116 is switched on (i.e., an overcurrent condition).

In one embodiment of the control circuitry 102, when DCM occurs and no overcurrent condition occurs, another power delivery switching cycle is initiated and the switch 116 is switched on for the constant ON-time as determined by the constant ON-time generator circuitry 120. In one embodiment, the power switching control circuitry 102 includes a logic gate 144 (e.g., an AND gate) coupled to both the DCM detection circuitry 130 and the OCP circuitry 140 to provide a switching control signal or a fire signal that initiates the power delivery switching cycle. In this illustrated embodiment, the logic gate 144 provides the fire signal (FIRE=1) when a DCM output signal is received indicating that DCM has occurred (e.g., DCM=1) and when an OCP output signal is received indicating that no overcurrent has occurred (OCP=1).

In the illustrated embodiment of the control circuitry 102, the FIRE signal provided by logic gate 144 initiates another power delivery switching cycle by setting the latch 118 to activate the switch 116 and triggering the constant ON-time generator circuitry 120 to maintain the constant ON-time for the switch 116. After the constant ON-time has expired as determined by the constant ON-time generator circuitry 120, the constant ON-time generator circuitry 120 resets the latch 118 to deactivate the switch.

The power switching control circuitry 102 may also include a blanking period generator 150 for generating a blanking period signal provided to the voltage measurement circuitry 104, the DCM detection circuitry 130 and the OCP circuitry 140. The blanking period signal can be used to temporarily disable or delay the output of the circuitry (i.e., during a blanking period) to prevent erroneous signals caused by voltage spikes, for example, when the switch is first deactivated. Those skilled in the art will recognize various circuitry configurations capable of generating a blanking period.

Figure 2B:
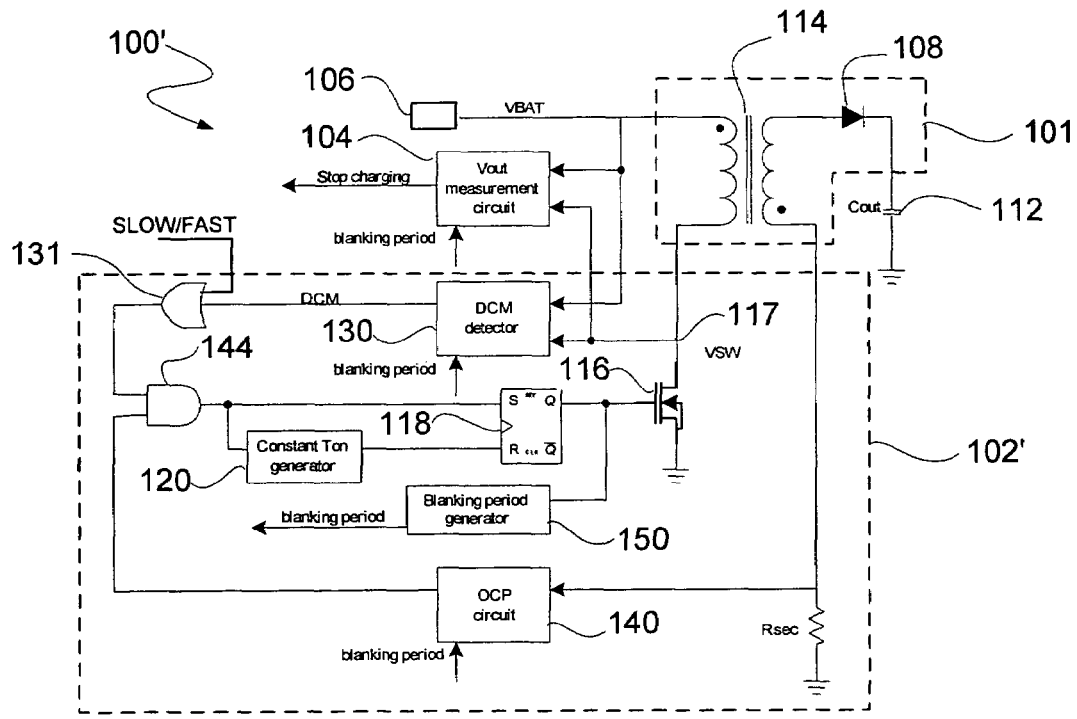
FIG. 2B is a schematic diagram of capacitor charging circuitry consistent with another embodiment.

FIG. 2B shows another embodiment of capacitor charging circuitry 100'. According to this embodiment, the capacitor charging circuitry 100' may operate in a slow charging mode and a fast charging mode. In a slow charging mode, the power delivery switching cycle is initiated when DCM occurs (i.e., flux in the transformer has collapsed) and when no overcurrent condition occurs (i.e., current level in the transformer is below a set level), as described above. In a fast charging mode, the power delivery switching cycle may be initiated only when no overcurrent condition occurs, without detecting DCM.

To implement the slow/fast charging modes in one embodiment, the power switching control circuitry 102' may include a logic gate 131 (e.g., an OR gate) between the DCM detection circuitry 130 and the logic gate 144. The logic gate 131 receives a SLOW/FAST command, for example, from external control circuitry. In this embodiment, the logic gate 144 provides the fire signal (FIRE=1) when an OCP output signal (OCP=1) is received and when either a DCM output signal is provided (DCM=1) or when the SLOW/FAST command indicates a fast charging mode (SLOW/FAST=1). In other words, in fast charging mode, the DCM signal may be ignored and the FIRE signal may be issued based on the OCP output signal only, even if DCM does not occur (e.g., DCM=0).

Figure 3:
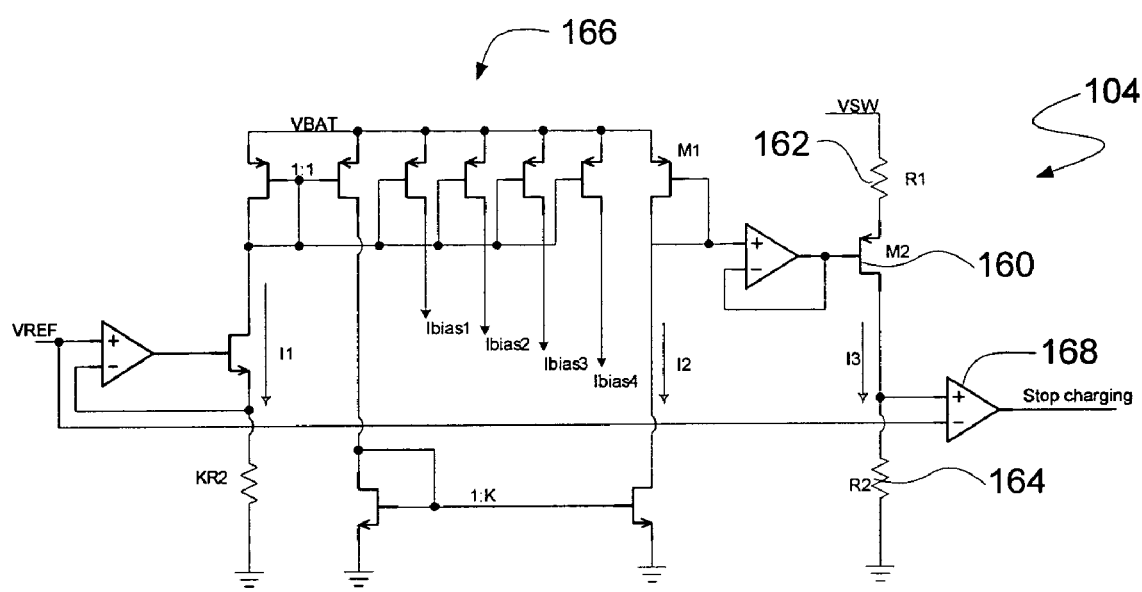
FIG. 3 is a circuit diagram of one embodiment of output voltage measurement circuitry used in the capacitor charging circuitry.

FIG. 3 shows one embodiment of the voltage measurement circuitry 104. The voltage measurement circuitry 104 stops charging of the capacitor 112 when the measured voltage reaches a predetermined level. The exemplary voltage measurement circuit 104 indirectly measures the output voltage $V_{out}$ through the primary coil of the transformer 114 by measuring a flyback pulse when the switch 116 is off. More specifically, the exemplary voltage measurement circuitry 104 receives switch voltage $V_{SW}$ at node 117 and power source voltage $V_{BAT}$ and determines a measured voltage $V_{R2}$, which is compared to a reference voltage $V_{REF}$. In this embodiment, a common gate amplifier 160 may be used as a level shifter to convert the flyback voltage into the measured voltage $V_{R2}$. The measured voltage $V_{R2}$ may be represented according to the following equation:

$$V_{R2}=R2/R1\times(V_{out}/N) \quad (1)$$

wherein R1 and R2 are the resistance values of the resistors 162, 164, respectively, N is the secondary-to-primary transformer turns ratio, and $V_{out}/N$ represents the flyback voltage.

The common gate amplifier 160 may be implemented using a positive-channel metal oxide semiconductor (PMOS M2). The voltage measurement circuit 104 may include bias circuitry 166 to ensure that $I_2=I_3$ so that gate-to-source voltages $V_{GS}$ of M1 and M2 are equal. Under this condition, the voltage at the source of common gate amplifier 160 (PMOS M2) is equal to the source voltage $V_{BAT}$.

A comparator 168 compares the measured voltage $V_{R2}$ to a reference voltage $V_{REF}$ and provides a stop charging signal if the measured voltage $V_{R2}$ reaches or exceeds the reference voltage $V_{REF}$. The stop charging signal may, for example, reset a latch (not shown), which may keep resetting the latch 118 in the control circuitry 102 to prevent charging until a new start command is received. As an example, if $V_{REF}=1.5$, R2/R1=0.1, and N=20, the capacitor 112 will be charged up to 300V, and then the charging will be stopped.

During this period when the charging is stopped, the voltage on the capacitor may droop due to the inherent leakage current of the diode 108 and/or capacitor 112. To start charging again, the microprocessor or the relevant external control circuit may wake up the capacitor charging circuitry 100 after a predetermined period of time, taking into consideration the allowable voltage droop across the capacitor. For example, the resetting of the latch 118 is stopped to allow a power delivery switching cycle to be initiated once again. The ON-OFF cycle of the capacitor charging circuit may determine the refresh rate, which depends on the timing of the microprocessor or relevant external control circuit.

In a photoflash application, the microprocessor or the relevant external control circuit may initiate a discharge of the capacitor 112 to produce the flash. Thereafter, the microprocessor or relevant external control circuit may wake up the capacitor charging circuit 100 again to allow a power delivery switching cycle to be initiated to perform the charging of the capacitor 112.

Figure 4:
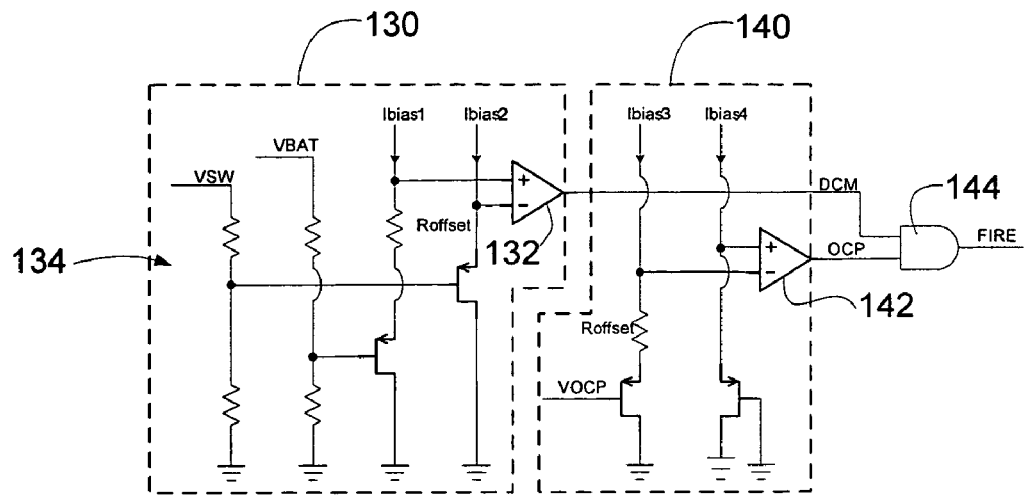
FIG. 4 is a circuit diagram of one embodiment of discontinuous conduction mode (DCM) and overcurrent protection (OCP) circuitry used in the capacitor charging circuitry.

FIG. 4 shows one embodiment of the DCM detection circuitry 130 and the overcurrent protection circuitry 140. When the flux within the transformer 114 has collapsed completely and the flyback voltage is equal to zero, a discontinuous conduction mode (DCM) occurs in the transformer 114. To detect the DCM, the DCM detection circuitry 130 receives switch voltage $V_{SW}$ and source voltage $V_{BAT}$ and determines if the flyback voltage is lower than a predetermined threshold value. Because the switch voltage $V_{SW}$ could be higher than the gate breakdown voltage of a transistor of a low voltage process, the DCM detection circuitry 130 may include a resistive divider 134 to attenuate the voltage $V_{SW}$ to a safe level for further processing.

The DCM detection circuitry 130 may include a comparator 132 that compares switch voltage $V_{SW}$ and source voltage $V_{BAT}$ and provides an output signal indicating when DCM occurs. The exemplary DCM detection circuitry 130 receives bias currents $I_{bias1}$ and $I_{bias2}$ and performs a comparison according to the following equations:

$$K \times V_{SW} + V_{GS} = K \times V_{BAT} + V_{GS} + I_{bias1} \times R_{offset} \quad (2)$$

$$\therefore V_{SW} = V_{BAT} + V_{offset}/K \quad (3)$$

Thus, when the switch voltage is approximately equal to the source voltage ($V_{SW} = V_{BAT}$), the comparator 132 provides the DCM output signal indicating that DCM has occurred (i.e., DCM=1).

During the initial charging period when the output voltage $V_{OUT}$ is close to 0V, the amplitude of the flyback pulse is small and could be less than the DCM threshold. The DCM detection circuitry 130 may not be able to detect such a small voltage properly and as a result, may provide a DCM output signal (DCM=1) even though DCM has not occurred. If the power delivery switching cycle is initiated under these conditions, the primary current in the transformer 114 may build up and exceed the current limit of the switch 116 and the transformer 114.

The exemplary OCP circuitry 140 prevents the primary current from exceeding the current limit of the switch 116 and the transformer 114 by preventing activation of the switch 116 when an overcurrent condition occurs in the transformer. The OCP circuitry 140 receives bias currents $I_{bias3}$ and $I_{bias4}$ and an overcurrent protection voltage $V_{OCP}$ measured across resistor $R_{sec}$. The OCP circuitry 140 includes a comparator 142 that detects the overcurrent condition by determining, based on the voltage $V_{OCP}$, if the current level in the transformer 114 exceeds a certain level, as determined according to the following equations:

$$V_{OCP} + V_{GS} + R_{offset} \times I_{bias} = V_{GS} \quad (4)$$

$$V_{OCP} = -I_{sec\_valley} \times R_{sec} \quad (5)$$

Thus, the overcurrent level in the secondary winding of the transformer is:

$$I_{sec\_valley} = \frac{R_{offset}}{R_{sec}} \times I_{bias} \quad (6)$$

The corresponding current in the primary winding of the transformer is:

$$I_{Pvalley} = I_{sec\_valley} \times N \quad (7)$$

If the current level in the secondary winding of the transformer falls below $I_{sec\_valley}$, the comparator 142 provides the OCP output signal (i.e., OCP=1) indicating no overcurrent condition.

Figure 5:
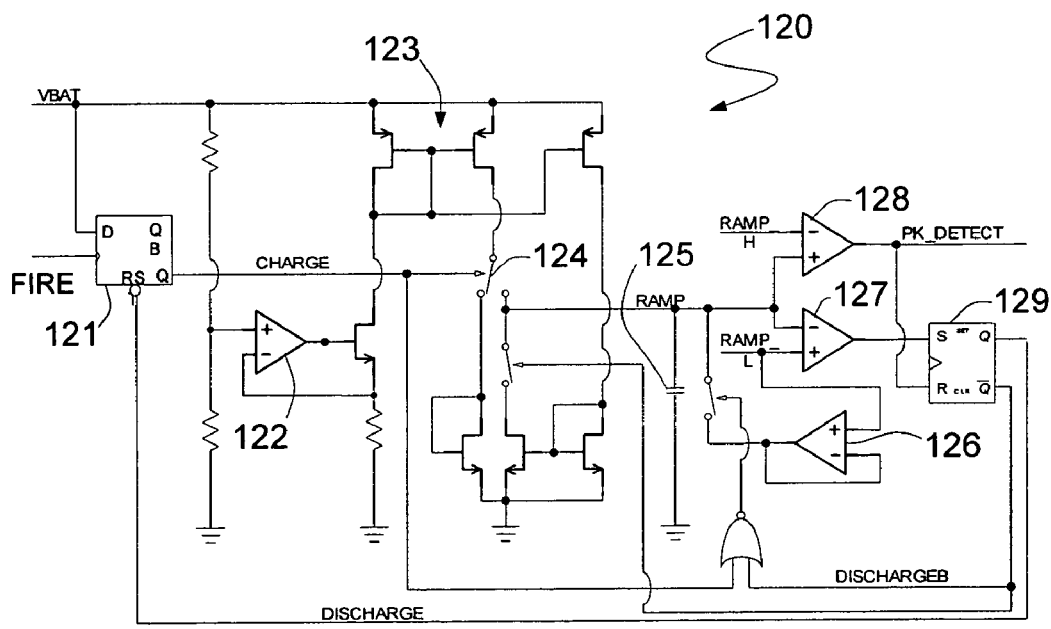
FIG. 5 is a circuit diagram of one embodiment of constant ON-time generator circuitry used in the capacitor charging circuitry.

FIG. 5 shows one embodiment of the constant ON-time generator circuitry 120. As discussed above, the FIRE signal sets ON the flip-flop or latch 118, which drives ON the switch 116, and triggers the constant ON-time generator circuitry 120. According to the illustrated embodiment, the constant ON-time generator circuitry 120 includes a latch 121 that receives the FIRE signal. The constant ON-time generator circuitry 120 may receive the source voltage $V_{BAT}$, which may be divided and applied to the current generator built around an operational amplifier 122 connected to a NMOS transistor. The current in the drain of the NMOS transistor, proportional with $V_{BAT}$, is sent to a current mirror 123. When the FIRE signal toggles the latch 121, its output signal CHARGE drives a switch 124 and directs the current mirrored by the current mirror 123 to a capacitor 125. The capacitor 125 is charged with the current proportional to $V_{BAT}$:

$$I_{charge} = k \times V_{BAT} \quad (8)$$

The voltage across the capacitor 125 increases from the initial $V_{RAMP\_L}$ level to the $V_{RAMP\_H}$ level. A comparator 128 detects when the capacitor voltage reaches $V_{RAMP\_H}$ level and outputs the signal PK_DETECT, which resets the latches or flip-flops 118 and 129. The flip-flop 129 switches ON the capacitor discharging circuit, and resets the latch 121. After the capacitor 125 is discharged, a comparator 127 sets the flip-flop 129, preparing it for a new cycle. The Q output of the flip-flop 118 is set high from the moment the FIRE signal sets it until it is reset by the PK_DETECT signal. The resulting ON-time, $t_{on}$ is:

$$t_{on} = \frac{C \times (V_{RAMP\_H} - V_{RAMP\_L})}{k \times V_{BAT}} = \frac{K_{ON}}{V_{BAT}} \quad (9)$$

Thus, the ON-time is inverse proportional to the source voltage $V_{BAT}$.

The corresponding current variation through the switch 116 and the primary winding of the transformer 114 is:

$$\Delta I_P = \frac{V_{BAT}}{L_P} \times t_{on} = \frac{K_{ON}}{L_P} \quad (10)$$

where $\Delta I_P$ is the current variation through the transformer's primary winding, $L_P$ is the transformer's primary inductance, and $K_{ON}$ is a constant:

$$K_{ON} = \frac{C \times (V_{RAMP\_H} - V_{RAMP\_L})}{k} \quad (11)$$

The peak current through the transformer's primary winding is:

$$I_{P\_pk} = I_{P valley} + \Delta I_P \quad (12)$$

Because the exemplary OCP circuitry 140 prevents charging during an overcurrent condition and constant ON-time generator circuitry 120 maintains the current variation constant, the power switching control circuitry 102 does not need to directly monitor the primary current limit and the sense resistor used in conventional capacitor charging circuitry can be eliminated.

Although the exemplary embodiment shows one configuration for the constant ON-time generator circuitry 120, those skilled in the art will recognize that other configurations are possible to provide a constant ON-time.

Figure 6:
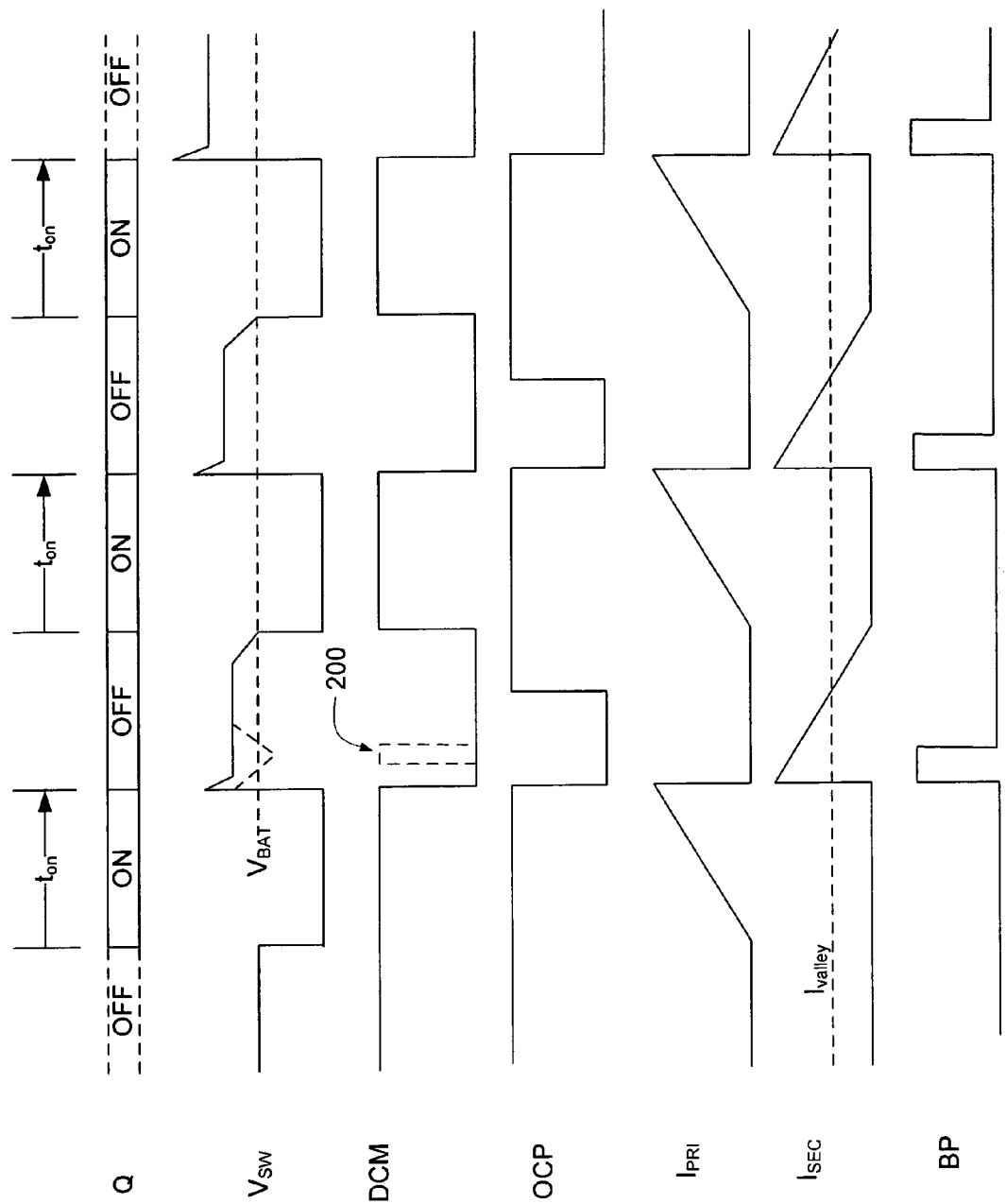
FIG. 6 is a timing diagram illustrating waveforms during one mode of operation of power switching control circuitry.

FIG. 6 shows various waveforms associated with embodiments of the power switching control circuitry 102 and the power switching control circuitry 102' operating in SLOW charging mode (i.e., discontinuous conduction mode). When the switch is activated during a constant ON-time ($t_{on}$), the switch voltage $V_{SW}$ drops to zero and the primary current $I_{PRI}$ increases. After the constant ON-time, the switch is deactivated, the primary current $I_{PRI}$ drops to zero, and the switch voltage $V_{SW}$ increases. To compensate the primary induced magnetic flux, a current $I_{SEC}$ starts flowing in the secondary winding and initially $I_{SEC} = I_{PRI\_PK}/N$. During the OFF-time, the secondary current $I_{SEC}$ decreases. When the flux within transformer collapses and the flyback voltage is equal to zero (i.e., $V_{SW} = V_{BAT}$), the DCM output signal is generated (DCM=1). As long as the overcurrent condition does not occur, the overcurrent protection signal is generated (OCP=1). When OCP=1 and DCM=1, the switch will be activated again for another ON-time duration ($t_{on}$). If the DCM output signal 200 is generated because the flyback voltage falls below the DCM threshold during an initial charging period when $V_{out}$ is close to zero, the switch will not be activated if OCP=0. In this embodiment, the blanking period (BP) occurs when the switch is first deactivated to prevent erroneous signals caused by voltage spikes.

FIG. 7 shows various waveforms associated with the embodiments of the power switching control circuitry 102' operating in FAST charging mode (i.e., continuous current operation). During the FAST charging mode, the switch will be activated for an ON-time duration ($t_{on}$) only when OCP=1. As a result, the switch is activated before DCM occurs when the secondary current $I_{SEC}$ falls to the set level $I_{valley}$. When the switch is activated, the corresponding current in the primary winding $I_{PRI}$ is $N \times I_{valley}$, thereby providing a continuous current operation.

In summary, a capacitor charging circuit comprises: power transfer circuitry configured to transfer power from a power source to the capacitive load; power switching control circuitry configured to control switching of the power source to the power transfer circuitry such that power is delivered to the power transfer circuitry for a constant ON-time; and voltage measurement circuitry configured to measure an output voltage of the power transfer circuitry to determine when to stop charging the capacitive load. A method of charging a capacitive load comprises monitoring a transformer to detect a discontinuous conduction mode in the transformer and monitoring the transformer to detect an overcurrent condition in the transformer. If the discontinuous conduction mode is detected and/or no overcurrent condition is detected, a power delivery switching cycle is initiated. The power delivery switching cycle has a constant ON-time such that power is switched ON to the transformer during said constant ON-time and power is switched OFF when the constant ON-time expires. The output voltage is measured to determine when to stop charging said capacitive load Accordingly, the capacitor charging circuitry charges a capacitive load more efficiently by minimizing current leakage and power dissipation.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A capacitor charging circuit for charging a capacitive load, said capacitor charging circuit comprising:
    a power transfer circuitry comprising a transformer for transferring power from a power source to said capacitive load;
    a power switching control circuitry for controlling switching of said power source to said power transfer circuitry and for delivering said power to said power transfer circuitry for a constant ON-time;
    a discontinuous conduction mode (DCM) detection circuitry coupled to said transformer and for generating a discontinuous conduction mode (DCM) signal indicative of an occurrence of a discontinuous conduction mode in said transformer;
    an overcurrent protection (OCP) circuitry coupled to said transformer and for generating an overcurrent signal indicative of an overcurrent condition in said transformer;
    a constant ON-time generator circuitry for receiving said DCM signal and said overcurrent signal and for generating said constant ON-time according to said DCM signal and said overcurrent signal; and
    a voltage measurement circuitry for measuring an output voltage of said power transfer circuitry to determine when to stop charging said capacitive load.

2. The capacitor charging circuit of claim 1, wherein said voltage measurement circuitry is configured to measure said output voltage indirectly by measuring a flyback voltage of said transformer.

3. The capacitor charging circuit of claim 2 wherein said voltage measurement circuitry comprises a circuitry configured to convert said flyback voltage into a measured voltage and configured to compare said measured voltage to a reference voltage.

4. The capacitor charging circuit of claim 1, wherein said power switching control circuitry comprises a switch for switching said power source to said power transfer circuitry.

5. The capacitor charging circuit of claim 4, wherein said constant ON-time generator circuitry is configured to allow said switch to remain on for said constant ON-time.

6. The capacitor charging circuit of claim 1, wherein said constant ON-time is inversely proportional to a source voltage.

7. The capacitor charging circuit of claim 4, wherein said power switching control circuitry is configured to switch on said switch when no overcurrent condition occurs.

8. The capacitor charging circuit of claim 7, wherein said power switching control circuitry is configured to switch on said switch when said discontinuous conduction mode occurs.

9. The capacitor charging circuit of claim 4, wherein said power switching control circuitry comprises a switching control logic responsive to at least one of said DCM detection circuitry and said OCP circuitry for providing a switching control signal to switch on said switch.

10. The capacitor charging circuit of claim 9 wherein said switching control logic is configured to receives a slow/fast command indicating a slow charging mode or a fast charging mode, wherein said switching control logic is configured to switch on said switch only when no overcurrent condition occurs during a fast charging mode, and wherein said switching control logic is configured to switch on said switch when no overcurrent condition occurs and when DCM occurs during a slow charging mode.

11. The capacitor charging circuit of claim 1, further comprising:
  a blanking period generator configured to generate a blanking period signal, wherein said power switching control circuitry and said voltage measurement circuitry are configured to receive said blanking period signal.

12. A method of charging a capacitive load, comprising:
  coupling said capacitive load to a transformer;
  receiving a discontinuous conduction mode (DCM) signal indicative of an occurrence of a discontinuous conduction mode in said transformer;
  receiving an overcurrent signal indicative of an overcurrent condition in said transformer;
  generating a constant ON time according to said DCM signal and said overcurrent signal;
  delivering power to said transformer for said constant ON time;
  maintaining a current variation through a primary winding of said transformer to be constant during said constant ON-time; and
  measuring an output voltage to determine when to stop charging said capacitive load.

13. The method of claim 12, wherein said power delivery switching cycle is initiated if said discontinuous conduction mode occurs.

14. The method of claim 12, wherein said constant ON-time is inversely proportional to a source voltage.

15. The method of claim 12, wherein said output voltage is measured when said power is not being delivered.

16. The method of claim 12, wherein said output voltage is measured indirectly by measuring a flyback voltage of said transformer.

17. The method of claim 12, wherein measuring said output voltage comprises converting a flyback voltage into a measured voltage and comparing said measured voltage to a reference voltage.

18. The method of claim 12, wherein monitoring said transformer to detect said discontinuous conduction mode comprises monitoring said transformer to determine when a flyback voltage of said transformer is below a predetermined threshold.

19. The method of claim 12, wherein said power is switched ON by setting a latch to activate a switch coupled to said transformer, and wherein said power is switched off by resetting said latch to deactivate said switch.

20. The method of claim 12, wherein initiating said power delivery switching cycle comprises determining said constant ON-time using a constant ON-time generator circuitry, and wherein said constant ON-time generator circuitry allows said switch to remain on for said constant ON-time.

21. A power switching control circuit coupled to a transformer for powering a capacitive load, said power switching control circuit comprising:
  a discontinuous conduction mode (DCM) detection circuitry for generating a discontinuous conduction mode (DCM) signal indicative of an occurrence of a discontinuous conduction mode in said transformer;
  an overcurrent protection (OCP) circuitry for generating an overcurrent signal indicative of an overcurrent condition in said transformer;
  a switching control logic coupled to said DCM circuitry and to said OCP circuitry for providing a switching control signal according to said DCM signal and said overcurrent signal;
  a switch for switching power to said transformer in response to said switching control signal for a constant ON-time; and
  a constant ON-time generator circuitry coupled to said DCM detection circuitry and said OCP circuitry for receiving said switch control signal and for determining said constant ON-time.

22. The power switching control circuit of claim 21, wherein said switching control logic is configured to provide said switching control signal when said discontinuous conduction mode is detected and when no overcurrent condition is detected.

23. The power switching control circuit of claim 21, wherein said switching control logic is configured to provide said switching control signal when no overcurrent condition is detected.

24. The power switching control circuit of claim 21, wherein said switching control logic is configured to provide said switching control signal when said discontinuous conduction mode is detected and when no overcurrent condition is detected, during a slow charging mode, and only when no overcurrent condition is detected, during a fast charging mode.

25. The power switching control circuit of claim 21, wherein said constant ON-time is inversely proportional to a source voltage.

26. The power switching control circuit 21, further comprising:
  a blanking period generator configured to generate a blanking period signal, wherein said DCM detection circuitry and said OCP circuitry are configured to receive said blanking period signal.

27. The power switching control circuit of claim 21, further comprising:
  a latch coupled between said constant ON-time generator circuitry and said switch for switching on said switch,
  wherein said latch is configured to activate said switch in response to said switching control signal, and wherein said latch is configured to deactivate said switch in response to said constant ON-time generator circuitry after said constant ON-time expires.

* * * * *